United States Patent [19]

Braendle et al.

[11] Patent Number: 4,879,853
[45] Date of Patent: Nov. 14, 1989

[54] VEHICLE WINDOW AND A METHOD OF MANUFACTURING THE WINDOW

[75] Inventors: Jürg G. Braendle, Baech; Saur Wolfgang, Buttikon, both of Switzerland

[73] Assignee: Gurit Essex AG, Freienbach, Switzerland

[21] Appl. No.: 255,641

[22] Filed: Oct. 11, 1988

[30] Foreign Application Priority Data

Oct. 14, 1987 [CH] Switzerland ............................ 4026/87
Apr. 20, 1988 [CH] Switzerland ............................ 1497/88

[51] Int. Cl.$^4$ ............................................. E06B 3/00
[52] U.S. Cl. ..................................... 52/208; 296/201; 52/397
[58] Field of Search ................... 52/208, 397; 296/201

[56] References Cited

U.S. PATENT DOCUMENTS

| | | | |
|---|---|---|---|
| 3,462,903 | 8/1969 | Kronbetter | 52/208 X |
| 3,514,916 | 6/1970 | Hoverman, Jr. | 52/208 X |
| 4,635,420 | 1/1987 | Batky | 52/208 X |
| 4,738,482 | 4/1988 | Bohm et al. | 296/201 X |

FOREIGN PATENT DOCUMENTS

| | | | |
|---|---|---|---|
| 0073350 | 6/1983 | European Pat. Off. | 296/201 |
| 2730831 | 1/1978 | Fed. Rep. of Germany. | |
| 3409831 | 10/1984 | Fed. Rep. of Germany. | |
| 3409960 | 10/1984 | Fed. Rep. of Germany. | |
| 3638449 | 5/1988 | Fed. Rep. of Germany. | |
| 2595402 | 8/1987 | France | 52/208 |

Primary Examiner—Carl D. Friedman
Assistant Examiner—Lan Mai
Attorney, Agent, or Firm—Curtis, Morris & Safford

[57] ABSTRACT

The present invention generally relates to the mounting of windows in a frame, particularly to the mounting of windows of a vehicle, e.g. an automobile, in the body frame work. The invention provides a window ready to be mounted comprising, along its edges, a first profiled bead of adhesive material, already cured and having the general cross section of an U-profile. This first bead is elastic but not plastically deformable. The first bead comprises in its interior a second bead of plastically deformable not yet cured adhesive material consisting of a substance chemically compatible to the material of the first bead. The second bead, serving as the real adhesive material, is protected from environmental influences e.g. by covering it by a protection foil which is removed just prior to mounting the window.

19 Claims, 6 Drawing Sheets

VEHICLE WINDOW AND A METHOD OF MANUFACTURING THE WINDOW

BACKGROUND OF THE INVENTION

1. Field of the Invention

The present invention generally relates to the mounting of windows in a frame, particularly to the mounting of windows of a vehicle, e.g. an automobile, in the body frame work. The invention provides a window ready to be mounted comprising, along its edges, a first profiled bead of adhesive material, already cured and having the general cross section of an U-profile. This first bead is elastic but not plastically deformable. The first bead is adapted to receive in its interior a second bead of plastically deformable not yet cured adhesive material consisting of a substance chemically compatible to the material of the first bead. Further, the invention relates to a method of manufacturing a vehicle window of the kind mentioned above.

2. Prior Art

Conventionally, a vehicle window is fixed in the frame of a vehicle body by means of a double U-profile frame member made of rubber or a similarly elastically resilient material. On the one hand, the edge of the window is received in a first recess of the double U-profile facing the interior of the double U-profile frame member, and on the other hand, the second recess directed away from the double U-profile frame member engages the edges of a body frame, of a flange or the like of the vehicle body to thereby fix the window in its desired position.

More and more, to so-called direct mounting of vehicle windows is used in which an edge portion of the window is glued to the edges of a body frame, of a flange or the like e.g. of a vehicle body by means of a suitable adhesive material. The known methods may be divided into the following three groups:

1. Methods in which the window is delivered to the car manufacturer in a "pure" form, in some cases equipped with a layer of material along its edges which is impermeable to light and UV-radiation and/or with a layer of primer material. No further preparation of the window glass has been effected. Thereby, the mounting adhesive material is applied immediately in situ, i.e. just before mounting the window into the car body by gluing.

2. Methods in which the window is provided with a first bead of adhesive material, if appropriate also using a light- or UV-impermeable layer and/or a primer layer. The application of this first bead is performed separatly from the car manufacturing plant or from the assembling line. The first bead is fully cured. The real mounting material is again applied immediately prior to mounting the window into the frame of the car body.

3. Methods in which the window is fully prepared, ready to be mounted, distantly from the assembling line and probably some time prior to having to be mounted. Thereby, the adhesive bead required for gluing the window into the frame of the car body, consisting of a polyurethane material curing under the influence of moisture, is applied along the edges of the window, and the window thus prepared, ready to be mounted, is sealed in air tight foil material to enable the window to be stored during a certain period without curing of the adhesive material.

All three methods mentioned hereinabove can not provide an optimal solution. The reason is that in all cases considerable time- and labour-consuming operations have to be performed to prepare the window for mounting. These operations have to be done immediately in situ, e.g. at the assembly line for an automobile. Particularly, in the case of the methods 1. and 2. explained hereinbefore, the window probably has to be cleaned along its edge portion and the adhesive material must be applied to the window and/or to the edge portion of the frame, of the flange or the like of a car body. In the case of method 3. explained hereinbefore, a large sized sealing foil must be carefully removed in order not to damage the already applied adhesive material and the large and expensive sealing foil must be removed from the work place and destroyed or recycled in some way.

The purpose of the present invention is, generally speaking and in the widest sense, to improve a method of the category 3. explained hereinbefore and to provide an improved ready-to-mount vehicle window.

A method relating to the aforementioned category 1. is known, for instance, from the published German Patent Application P 27 30 831 and must not be discussed in detail here. The disadvantages of the methods according to category 1. are well known in the art; particularly disadvantageous is that the edge portion onto which the adhesive material is applied has to be cleaned just prior to applying the adhesive material, the time-consuming applying of the adhesive material bead which must be performed with the utmost accuracy and the short period of time provided to perform these operation which is directly dependent from the operation cycle set for the assembly line.

The published German Patent Application P 34 09 831 discloses a vehicle window suitable for adhesive mounting in a car body; the subject matter of that application belongs to the aforementioned category 2.

The window comprises two glass layers; the glass layer facing the interior of the vehicle is smaller than the outer glass layer such that a step-shaped recess is formed running along the edge of the window. The glass layer with the larger size comprises a frame-like strip applied to the projecting edge portion and consisting of a light-impermeable material. Onto this frame-like strip is applied a continuous bead consisting of a sealing and adhesive material filling the step-shaped recess and preventing a diffusion of steam into the space between the two glass layers. The size and shape of the aforementioned continuous bead serves as an intermediate layer for the real adhesive material required to mount the window in the mounting flange of the car body.

The continuous bead can be applied to the step-shaped recess provided in the window just in the factory, immediately after the manufacturing process of the window, and thus provides a reliable sealing of the intermediate layer provided between the two glass layers from the atmospheric moisture.

If the said continuous bead projects over the inner glas layer, it serves simultaneously as a spacer if the windows are stacked one over the other one.

The continuous bead according to the aforementioned German Patent Application P 34 09 831 is preferably covered by means of a protection foil or a corresponding protection strip made of paper which is removed immediately prior to mounting the window into the car body.

The adhesive bonding of the vehicle window with the mounting flange of the car body may be performed in different ways. Preferably, a layer or a further bead of adhesive material compatible with the material of the aforementioned continuous bead is applied onto the latter one with the result that the aforementioned continuous bead serves as an intermediate body between the window and the adhesive layer.

The method according to the published German Patent Application P 34 09 960 relates to the adhesive bonding of vehicle windows into the frame of a vehicle body whereby the adhesive material is applied directly at the assembly line; thus, this publication belongs to the aforementioned category 2. According to Lhe disclosure of this publication two beads of compatible adhesive material are applied to the window in two separate phases. In the first phase, a profiled bead of adhesive material is applied onto an edge region of the window and subsequently cured whereby one or more primer layers may be provided between said profiled bead and the surface of the window. Thus, in the second phase when the second bead is applied, the first profiled bead forms an intermediate body between the window and the second bead, said intermediated body being no longer plastically deformable.

While the profiled first bead applied onto the window is already cured when the window is to be mounted, the second bead is applied at the assembly line immediately before mounting the window.

It is admitted that certain minor advantages result from a method disclosed in the two aforementioned German Patent Applications, especially with respect to the application of the second bead of adhesive material which is the real bonding bead; however, many of the disadvantages discussed in connection with the proceeding according to category 1. hereinbefore are nevertheless existing.

The only publication known to the inventors which belongs to the aforementioned category 3., i.e. a method in which the window is prepared ready to be mounted into a car body, is the published German Patent Application P 36 38 449. According to the disclosure of this publication, the application of the adhesive material onto the window is performed independently with regard to time and place of the car to which the window has to be mounted. An adhesive material is used which cures under the influence of atmospheric moisture. The adhesive material is protected from any moisture during its application or immediately thereafter until to the moment of mounting the window into the car by a combination of a superposition of a dry protection gas with a chemical drying agent and/or a physical drying process.

The window with the applied adhesive material is singly or in groups of several units packaged in an environment free of moisture such that the adhesive material can not contact any moisture during the subsequent storage or transport.

Preferably, the window is sealed between air tight foils such that the foil have a certain distance from the adhesive material. Then, the air enclosed in this window package is evacuated and the package is filled with a protection gas. The pressure on the window and the adhesive material can correspond to the atmospheric environment pressure such that even soft parts of the package are not deformed.

In order to achieve a close fit of the foils, they can be heated during packing the window. Another possibility is to shape the foils at least in the region of the adhesive material which has to be touchless covered prior to welding the foil material. In order to prevent a slipping of the packed windows when stacked suitable projections can be provided when the foils are shaped. Vacuum-shaped hard foils can be used, but particularly if soft foils are used it may be advantageous to provide spacer members inserted into the packaging in the region of the adhesive material prior to sealing the foil. By the provision of spacers also a sliding of the windows within the packaging can be prevented.

In the place where the window is to be mounted, the still packed window must be ventilated in order to enable the foil to be removed. In order to support this operation the window packaging can comprise means for the ventilating of the packaging at a later date. For instance, suitable ventilating tubes may be provided in the packaging. The ventilating operation can be performed with air having a high humidity to displace the protection gas. If a certain time period has gone before the foil is removed the curing of the adhesive material can be accelerated.

Essential is, consequently, that the window is readily prepared by means of cleaning agents, primers and adhesive material separately with regard to time and place from the assembly line, from the repair shop or the like, and that the adhesive material is perfectly sealed against moisture.

It is true that a proceeding in line with the teaching of the aforementioned publication removes the need to apply the real mounting adhesive material bead in situ, e.g. at the assembly line. On the other hand, however, it is disadvantageous that the window prepared in accordance with the teaching of the aforementioned publication must firstly be prepared for the ventilating operation, that usually a certain time has to pass after the ventilation operation, that the unpacking of the window is cumbersome and time-consuming, and that the voluminous packaging material has to be removed from the work station and destroyed or recycled. Moreover, the aforementioned publication does not disclose how an unintentional and highly unwelcome escaping of the still pasty adhesive material over the edge of the window and/or into the viewing area of the window is avoided. Finally, there are no teachings in the aforementioned publication how a positioning or centering of the window within the frame or the mounting flange of the car body is supported or simplified.

OBJECTS OF THE INVENTION

It is a basic object of the invention to provide a vehicle window according to category 3. as mentioned hereinbefore having improved characteristics. Particularly, a vehicle window shall be provided which is ready to use at an assembly line, in a repair work shop or the like without the need to apply an adhesive material thereto.

It is a further object of the invention to provide a vehicle window in a ready-to-use condition which can be mounted into a car body framework without time-consuming preparation operations.

It is a still further object of the invention to provide a vehicle window in a ready-to-use condition which must not be ventilated and unpacked in a time-consuming operation prior to be ready to be mounted into the car body framework.

It is a still further object of the invention to provide a vehicle window in a ready-to-use condition which is not contained in a bulky package, thereby avoiding the need to unpack the window and to remove heavy packaging material from the work place.

It is a still further object of the invention to provide a vehicle window in a ready-to-use condition which includes means to support the centering and positioning, respectively, of the window in the frame into which it is to be mounted.

Finally, it is a still further object of the invention to provide a vehicle window in a ready-to-use condition which comprises means preventing that the still plastically deformable adhesive material may escape over the edge portion of the window and/or into the viewing field of the window upon mounting the window.

SUMMARY OF THE INVENTION

In order to meet these and other objects, the invention provides a window ready to be mounted comprising, along its edges, a first profiled bead of adhesive material, already cured and having the general cross section of an U-profile. This first bead is elastic but not plastically deformable. The first bead comprises in its interior a second bead of plastically deformable not yet cured adhesive material consisting of a substance chemically compatible to the material of the first bead. The second bead, serving as the real adhesive material, is protected from environmental influences e.g. by covering it by a protection foil which is removed just prior to mounting the window.

Particularly, the invention provides a prefabricated vehicle window adapted to be directly glued into a frame, a flange or the like, comprising a primer layer applied in an edge portion of the vehicle window and a first profiled bead consisting of an already cured adhesive material applied onto said primer layer extending along an edge portion of said vehicle window. The already cured adhesive material has elastic properties but cannot be plastically deformed, and the first profiled bead has a generally U-shaped cross section. The two legs of the U-shaped profile have different height, a first leg remote from the edge of the vehicle window having a greater height than a second leg adjacent to the edge of the vehicle window. The first profiled bead has a tub-like recess receiving a second bead consisting of a plastically deformable and/or activatable adhesive material which is chemically compatible with respect to the material of said first profiled bead.

Thus, upon delivering a prefabricated vehicle window according to the invention to the assembly line, is is only necessary, depending of the kind of the adhesive material used, to activate the adhesive material whereby the tub-shaped profile of the first bead, on the one hand, prevents the still pasty or to a pasty condition activated second bead from escaping out of the U-shaped recess of the first bead such that the edges and/or the viewing areas are not contaminated, and on the other hand, the cured first bead sets a reference for the positioning and centering of the prefabricated vehicle window within a frame or a aperture in a car body delimited by mounting flanges into which the window has to be bonded.

It was already stated that the two legs of the U-shaped profile have different height, a first leg remote from the edge of the vehicle window having a greater height than a second leg adjacent to the edge of the vehicle window. By this characteristic, the centering and positioning function of the first already cured bead is improved.

According to a preferred embodiment, the first higher leg of the first profiled bead comprises a rib projecting toward the interior of said tub-like recess such that an edge of the frame, flange or the like into which the window has to be mounted may engage therewith. This helps to hold the window in proper position up to the moment when the second bead of adhesive material has cured.

In order to ensure that the second bead may be covered in the easiest way, e.g. to protect it from mechanical damage or to protect it from the influence of moisture, light and the like, the second bead is fully received in the interior of said tub-like recess formed in the first bead.

Preferably, the second bead has an essentially triangular or trapezoidal cross section, the surface thereof adjacent to the opening of the tub-like recess ascending toward the higher leg of said first bead, and said second bead having two essentially perpendicularly running faces, one face thereof resting on the ground of the tub-like recess and the other face thereof resting on the higher leg of said first bead. Thus, it is ensured that the second bead which is still plastically deformable when the window is mounted cannot escape from the tub-like recess and merge into undesired regions of the window and/or the mounting frame, mounting flange or the like.

Preferably, said first bead is at least partially covered by a removable cover foil such that said cover foil does not touch said second bead in the interior of said tub-like recess. Depending of the material of the first and/or second bead, said cover foil may extend only between said first and second leg of said first bead such that the tub-like recess of said first bead is sealed, or said cover foil can fully enclose the first bead.

Preferably, said cover foil is gas tight and/or moisture tight and/or light tight and is adhesively but releasably connected to the first bead. In a preferred embodiment, the cover foil is a plastic foil which optionally may further comprise a metal layer, even more preferably an aluminium-plastic sandwich foil because these materials have been proven as having very good moisture, light and UV-radiation blocking properties.

The real adhesive material, i.e. the second bead, may consist of an adhesive material which cures under the influence of oxygen, of an adhesive material which cures under the influence of moisture, of an adhesive material which may be activated under the influence of heat, of an adhesive material which may be activated under the influence of heat and then irreversibly cures, or of a slowly curing two component adhesive material.

Furthermore, the invention provides a method of producing such a prefabricated window. In accordance with the invention, the method comprises the steps of extruding a first bead of adhesive material having an essentially U-shaped cross section along the edge portion of a window, curing said first bead of adhesive material after it has been deposited on the window, and depositing a second bead of adhesive material which is chemically compatible with respect to the adhesive material of the first bead and which is plastically deformable and/or activatable in the interior of the tub-like recess of the first bead, whereby the depositing and the curing of the first bead and the depositing of the second bead in the interior of the tub-like recess of the first bead is performed separately from the mounting of the vehicle window as far as time and place is concerned.

With other words, a window is prepared with cleaning agents, with a primer layer, with a first bead of adhesive material whereby the latter is cured. Then, the first bead is provided with a second bead of a suitable adhesive material as explained hereinabove. All these steps are performed e.g. in a specialized window manufacturing plant. Only then, i.e. when the window is ready to be mounted e.g. into the body of a car, it is transported to the assembly line and can be mounted without the need of any further steps required at the assembly line.

If the first bead consists of a moisture reactive polyurethane material, it is advisable to treat it with hot steam after its application onto the window to accelerate its curing. Thereafter, it can be cooled down to a low temperature before the second bead is applied into its interior.

In order to prevent the second bead from mechanical damage and/or from premature curing, it is recommended that the first bead is covered by a protection foil consisting preferably of a plastic-metal sandwich immediately after depositing the second bead into the tub-shaped recess of the first bead.

Preferably, the prefabricated vehicle window of of this invention is used as a ready-to-mount unit adapted to be mounted in car bodies by gluing without the need of an additional mounting adhesive material which must be applied in situ, e.g. at an assembly line.

BRIEF DESCRIPTION OF THE DRAWINGS

In the following, some preferred embodiments of the invention will be further described, with reference to the accompanying drawings, in which.

DESCRIPTION OF SOME PREFERRED EMBODIMENTS

Figure 1:
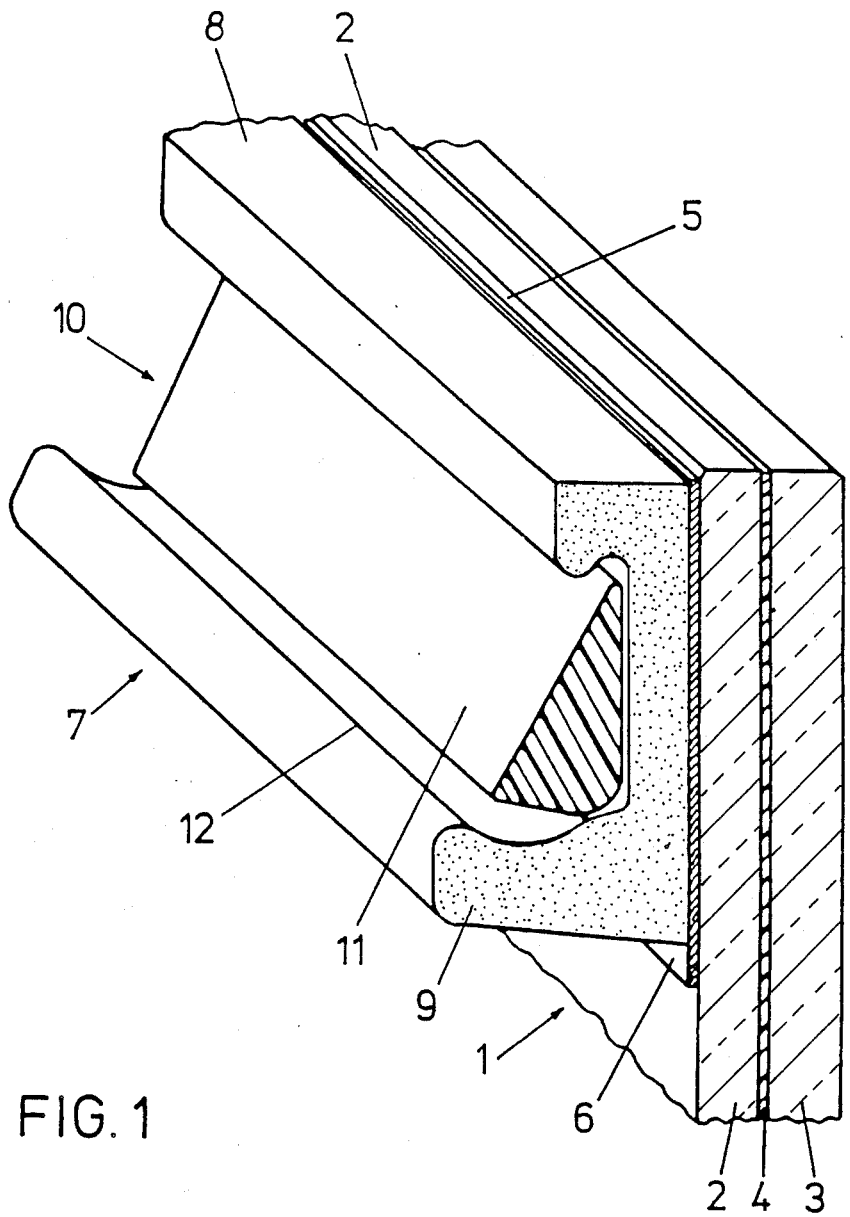
FIG. 1 shows a small part of a vehicle window in a partially sectioned view, comprising a first and a second bead of adhesive material, without protection cover.
Figure 2:
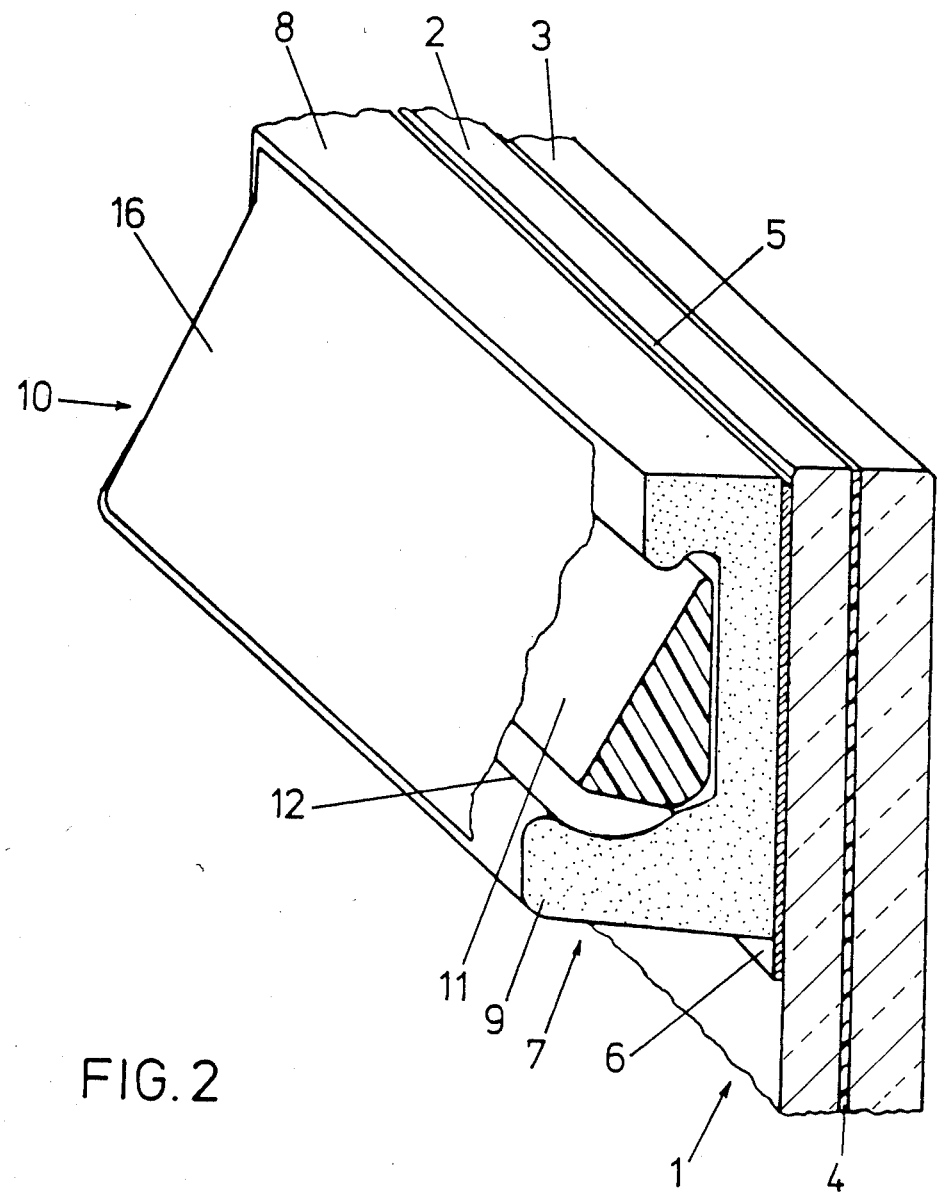
FIG. 2 shows a small part of a vehicle window in a partially sectioned view, comprising a first and a second bead of adhesive material, with a first embodiment of a protection cover.

The vehicle window to be mounted in a frame by adhesive bonding is, in the present example and as can be seen from the drawings, a composite window 1 comprising a first glass layer 2 and a second glass layer 3. The two glass layers are connected to each other by means of a thin plastic foil 4. The window 1 being mounted, the first glass layer 2 will face the interior of the vehicle and the free surface of the second glass layer 3 will be the outer surface of the window 1. The free surface of the first glass layer 2 is provided with a primer layer 6 applied onto the glass layer 2 along the edges 5 of the window 1.

The primer layer 6 serves as a base layer for a first bead, generally designed by reference numeral 7, to improve the adherence of the latter to the surface of the glass layer 2. The first bead 7 generally has an U-shaped cross section, thereby defining an inner tub-shaped recess 10, with a first, outer wall portion or leg 8 located adjacent to the edges 5 of the glass layer 2 and a second, inner wall portion or leg 9 facing the central portion of the glass layer 2. The second, inner wall portion 9 is higher than the first, outer wall portion 8. The two wall portions or legs 8 and 9 delimit an elongate tub-like recess 10 extending continuously along the edge of the window 1.

The tub-like recess 10 receives a second bead of adhesive material 11 which has essentially triangular (as shown in the drawings) or trapezoidal cross section. Thereby, the arrangement is such that the second adhesive bead 11, on the one hand, lies completely within the open tub-like recess 10 which is delimited by the two wall portions or legs 8 and 9, respectively; with other words, the second bead 11 does not project over a plane running through the two upper edges of the two wall portions or legs 8 and 9. On the other hand, the surface of the second bead 11 facing the open side of the tub-like recess 10 ascends toward the higher wall portion or leg 9 of the first bead 7. Preferably, during depositing of the second bead 11 into the tub-like recess 10, care should be taken that the said second bead 11 not only tightly fits the ground surface of the tub-like recess 10 but, whenever possible also but at least partly, the inner surface of the higher wall portion or leg 9. The reason therefore is to reduce the danger that the plastically deformable material of the second bead 11 escapes from the tub-like recess 10 over the lower wall portion or leg 8 when the window is mounted in the associated frame.

Figure 5:
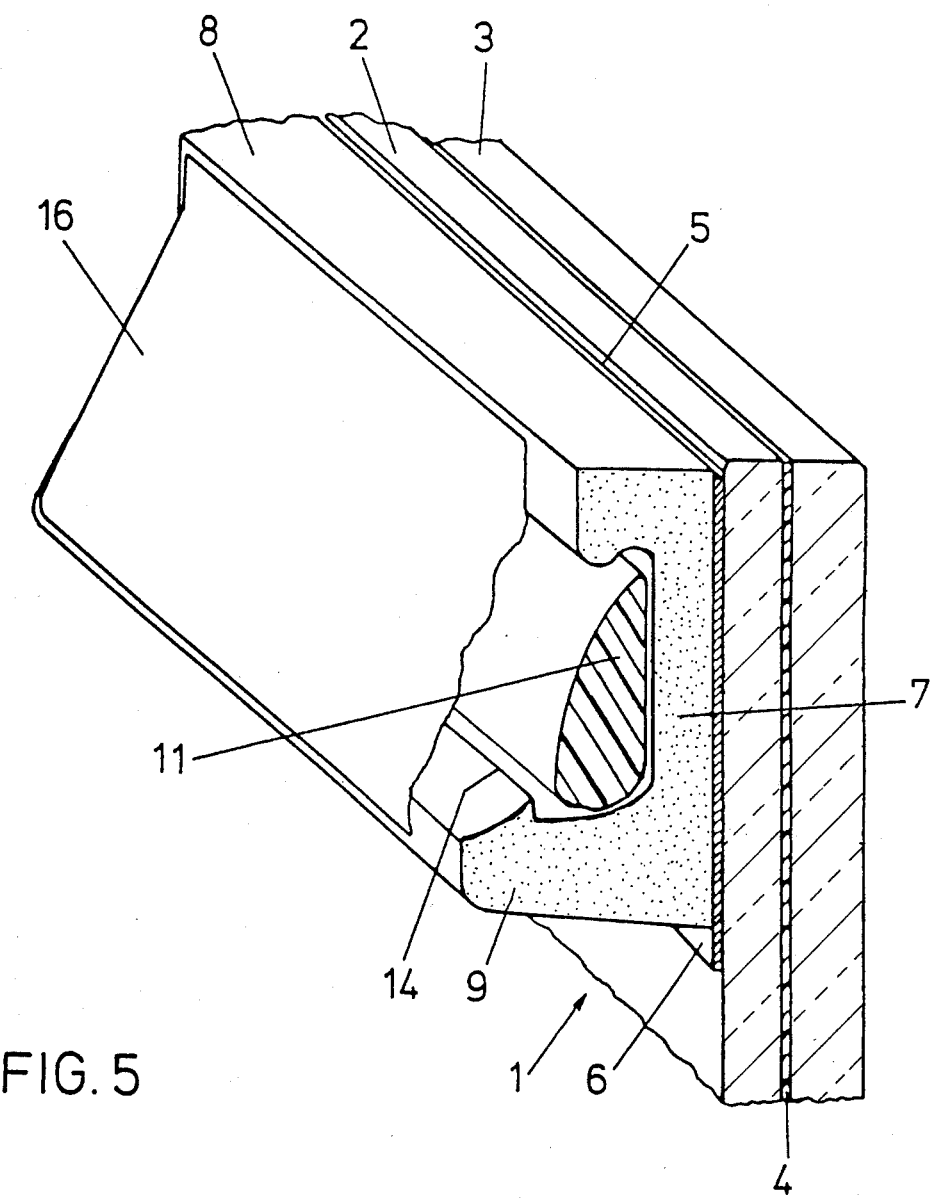
FIG. 5 shows a view similar to the one shown in FIG. 2, but with modified first and second beads.
Figure 6:
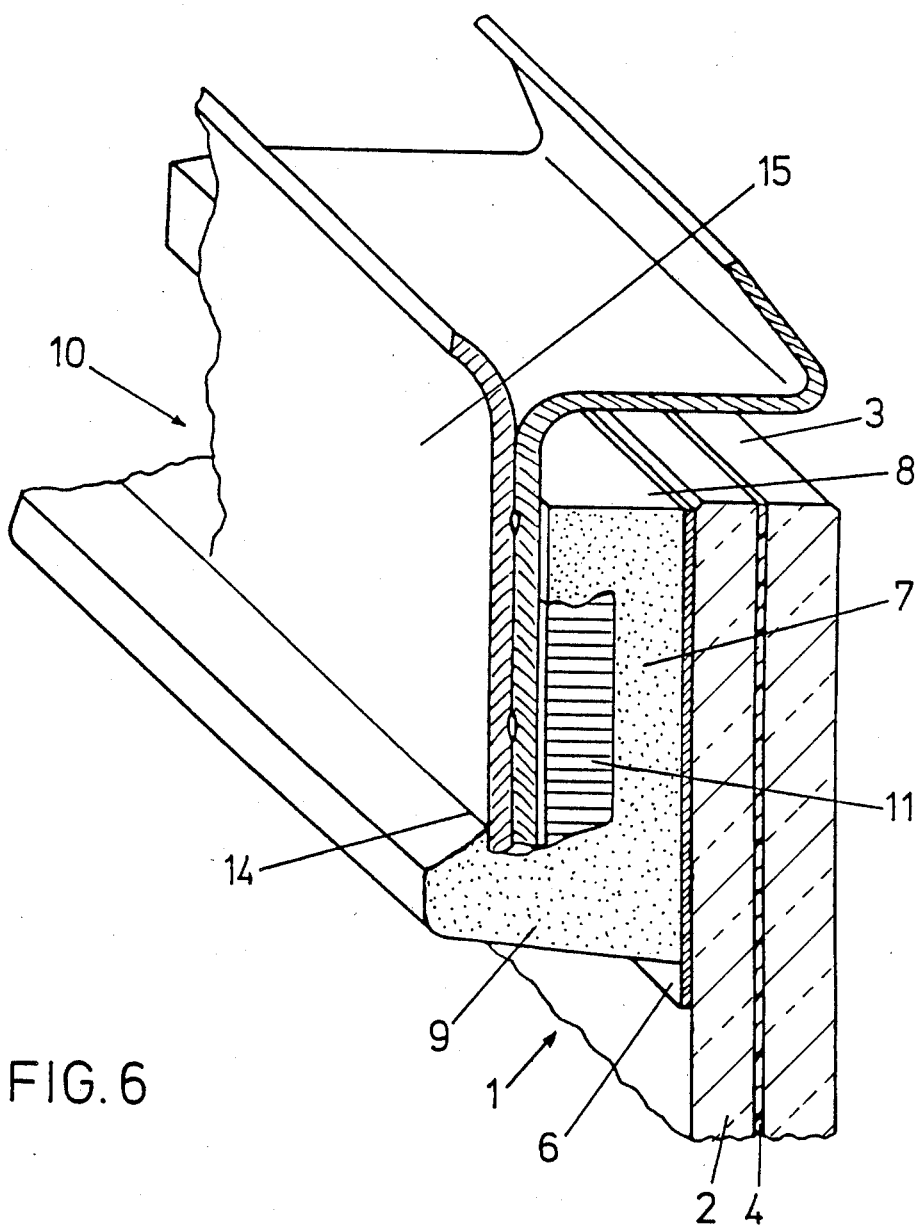
FIG. 6 shows a view similar to the one in FIG. 4, with the modified second bead according to FIG. 5.

The higher wall portion or leg 9 is provided, according to FIGS. 1 to 4, with a rib 12 or according to FIGS. 5 and 6 a rib 14, both projecting towards the interior of the tub-like recess 10. Since the material of the first bead 7 is elastic, the inner wall portion or leg 9 can be used to center and fix the window 1 after the mounting step during a time period until the second bead 11, i.e. the real adhesive bead, is cured and does not need any further mechanical support. The rib 12 of a first embodiment according to FIGS. 1 to 4 is located along the upper edge of the higher wall portion or leg 9 and engages the edge of a flange 15 (FIG. 4) of a (not shown) vehicle body as soon as the window 1 is mounted. The rib 14 of the second embodiment (FIGS. 5 and 6) is located somewhat below that upper edge of the higher wall portion or leg 9 and performs essentially an even more pronounced engaging function as can be clearly seen in FIG. 6, where the window 1 is inserted into a flange 15 of a (not shown) vehicle body.

An important feature of the vehicle window according to the present invention is that the second bead 11 consisting of adhesive material and located within the interior of the first, U-shaped bead 7 can be covered in order to avoid mechanical damage and contamination of the second bead 11 and/or in order to protect the second bead 11 from air, moisture, light or UV-radiation. It is understood that the measures to be taken depend on the material of the second bead 11. A first possibility shown in FIGS. 2 and 5 consists in providing a protection foil 16 extending between the upper edges of the outer and inner wall portions 8 and 9, respectively. Since the second bead 11 consisting of adhesive material is located completely within the tub-like recess 10 of the first bead 7, the protection foil 16 does not touch the second bead 11. This embodiment is sufficient in all cases if the material of the first bead 7 is impermeable itself with respect to gas, moisture, light, UV-radiation and the like.

Figure 3:
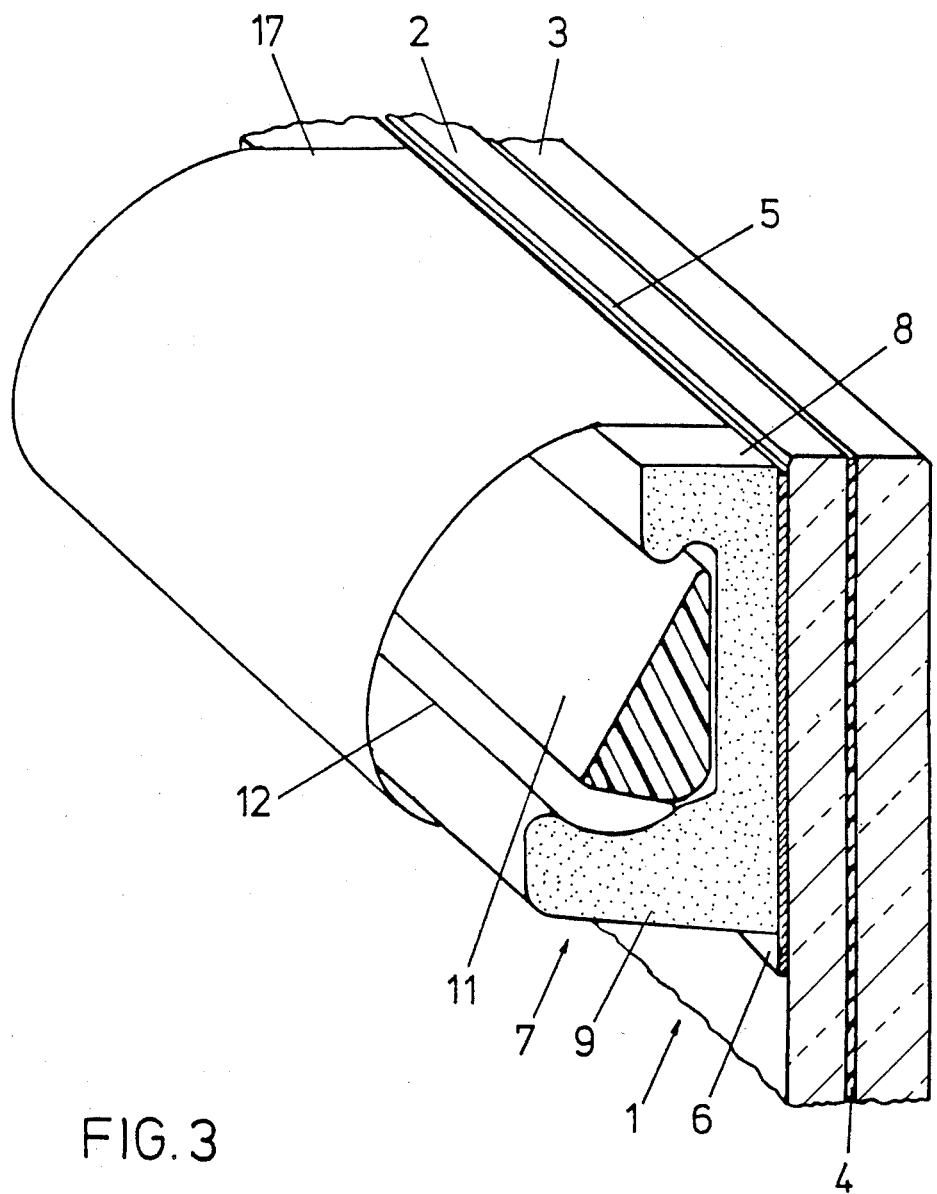
FIG. 3 shows a small part of a vehicle window in a partially sectioned view, comprising a first and a second bead of adhesive material, with a second embodiment of a protection cover.
Figure 4:
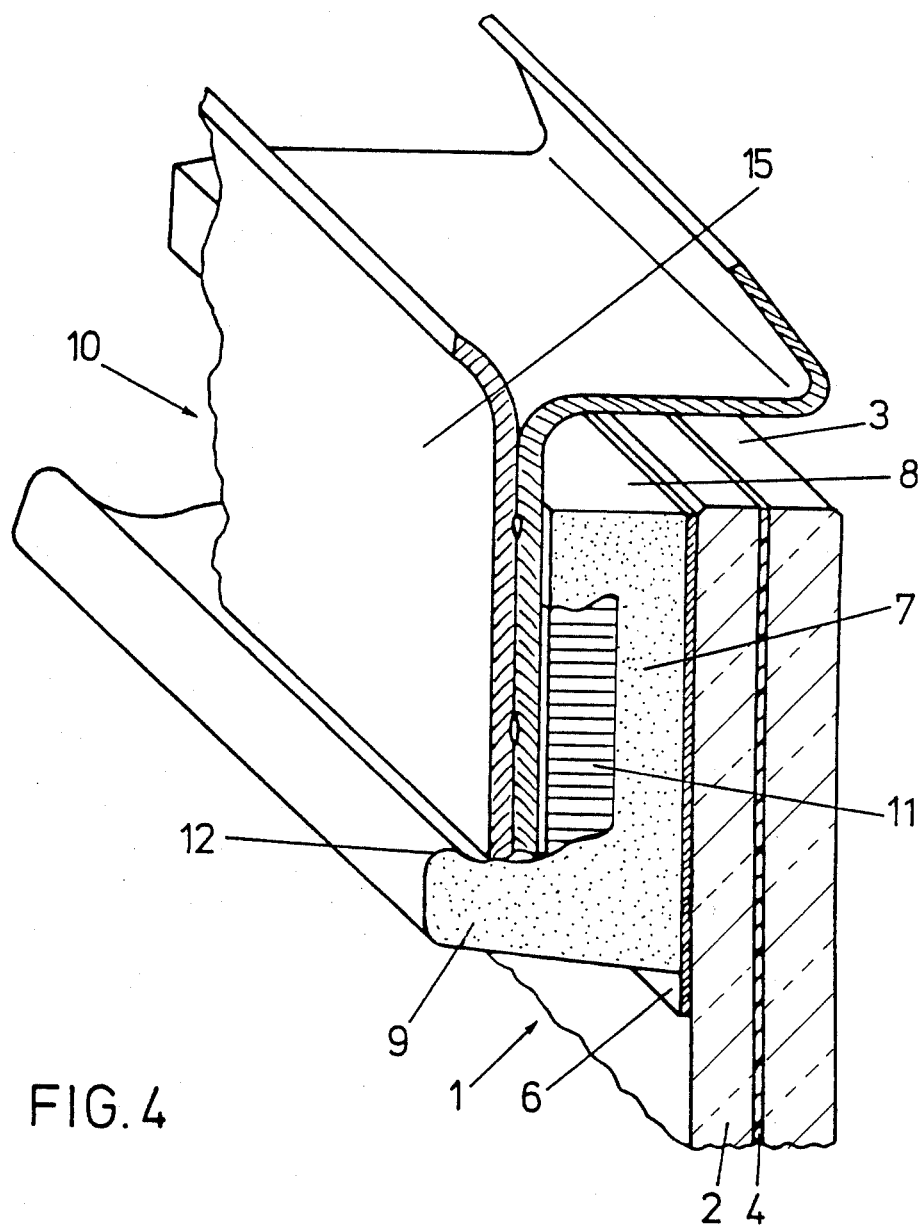
FIG. 4 shows a small part of a vehicle window in a partially sectioned view, comprising a first and a second bead of adhesive material, mounted in a frame shown in part.

If this is not the case, a protection foil 17 according to FIG. 3 can be provided which completely covers the first bead 7 and, consequently, also the second bead 11 of adhesive material without touching the latter one.

Preferably, a plastic foil material is used for the protection foils 16 or 17 which is gas tight, moisture tight and light tight. In the case of very high demands, preferably a metal covered plastic foil is used, e.g. an aluminium-plastic sandwich foil.

In order to enable the protection foil 16 and 17, respectively, without any effort immediately prior to mounting the window 1, the foils 16 and 17 respectively are adhesively fixed to the first bead 7 by means of a releasable adhesive material well known in the art.

The manufacture of the vehicle window according to the invention is performed as follows:

The vehicle window 1 is cleaned and, if appropriate, provided with a layer running along the edge 5 of the window 1 and being impermeable for light and UV-radiation. Then, the primer layer 6 is applied onto a portion of the window 1 running along its edge 5 as well. As a next step, the first bead 7 is applied onto said primer layer 6 by means of an extrusion method well known in the art which has not to be further explained here. It is understood that the extrusion process must provide the desired U-shaped cross section required for the window of this invention. Thereafter, the first bead 7 is cured; the curing process can be supported or accelerated, depending on the material used for the first bead 7, by treating it with heat and/or steam as soon as it has been applied onto the primer layer 6.

In a next step the first bead 7 can be cooled and/or dried, if necessary, in order to provide an optimal situation for applying the second bead 11 into the tub-like recess 10 provided in the first bead 7. The second bead 11 consists of a material or a substance which is chemically compatible with the material of the first bead 7. Further details with regard to the material of the first and second beads will be given hereinbelow. An essential point consists in the fact that the material of the second bead 11 is not cured or has a slow curing behaviour or can be activated later. Under certain circumstances the application of the second bead 11 and the mounting of the protection foil 16 and 17, respectively, must be performed in an inert protection gas atmosphere in order to prevent the material of the second bead 11 to react or to be activated too rapidly.

All these manufacturing steps as hereinbefore explained are performed separately with regard to time and place from the real mounting of the window. With other words, the window 1 can be pre-manufactured as a ready-to-mount unit in a manufacturing plant providing optimal conditions for cleaning the window, for applying the primer layer 6 and the first bead 7, for curing the latter one, for applying the second bead 11 and for fixing the protection foil 16 and 17, respectively. Thus, the prefabricated vehicle window can be delivered to e.g. an automotive manufacturing plant and the only step still necessary is to remove the protection foil 16 and 17 respectively and/or the activation of the second bead 11. The use of a real mounting adhesive material, particularly the time- and labour-consuming applying thereof onto the window is avoided.

The first bead 7 can consist of a polyurethane system material, for instance a moisture curing one component system or a chemically curing two component system. In the first case, the material once applied to the window 1, can be treated by hot steam to accelerate the curing thereof. Anyhow, these polyurethane materials cure quickly and remain elastic even in the fully cured state.

Several different materials can be used to realize the second bead 11:

a. Adhesive materials curing under the influence of oxygen

These substances have to be sealed against air and oxygen containing gases during their storage. Thus, it is essential to provide a protection foil 16 according to FIGS. 2 and 5 or, even better, a protection foil 17 according to FIG. 3 since most of the substances used for the forming of the first bead 7 are air-permeable to a certain extent. As an example for adhesive materials curing under the influence of oxygen can be mentioned: A mixture consisting of polyurethane prepolymer having mercaptan and groups and an oxydation accelerator, e.g. according to European Patent No. 0 066 167.

b. Adhesive materials curing under the influence of moisture

In this case, accordingly, the same remarks are true as listed under paragraph a. hereinbefore. As typical examples, the follows substances can be mentioned:
- Polymercapto compounds and alkaline earth peroxide in a water-free condition, e.g. according to U.S. Pat. No. 3,912,696 or U.S. Pat. No. 3,225,017.
- Polyurethane prepolymer having silane end groups, e.g. according to U.S. Pat. No. 3,632,557 or U.S. Pat. No. 4,222,925.
- Polyurethane prepolymer having isocyanate end groups, e.g. according to U.S. Pat. No. 3,779,794 or European Patent No. 0 040 469.
- Silicon compounds curing under the influence of moisture, e.g. according to German Patent 12 55 924 or British Patent 992 366.
- A mixture of a flexible epoxy resin with a polyfunctional cetamine.
- A mixture consisting of a flexible epoxy resin with a molecular sieve loaded with polyfunctional amine.

c. Thermoplastic adhesive substances

These adhesive substances are usually called "hot melts", are rigid at room temperature and get pasty or liquid upon heating them to a certain temperature. As soon as they are cooled down they will be rigid again. Due to the fact that the first bead 7 is a bad heat conductor, the conditions to use adhesive substances of this kind is favoured or even possible. The activated, i.e. heated second bead 11 is thermally insulated from the window 1 and therefore remains applicable during a sufficient time period. A covering by means of a protection foil 16 and 17, respectively, is not imperative except for the purpose of protecting the second bead 11 from contamination and/or mechanical damage. Examples for such substances are thermoplastic polyurethane caoutchouc.

d. Adhesive substances curing under the influence of heat

Generally, the same remarks are true in this case as listed under c. However, there is one important difference: As soon as these substances are heated over a critical temperature and subsequently cooled down they remain irreversibly in a solid condition. In practice, such a substance to form the second bead 11 is heated to a first temperature $T_1$ which is below the critical temperature $T_2$ in order to enable the second bead 11 to be applied into the tub-like recess 10 of the first bead 7. Upon mounting the window 1 the second bead 11 is heated again but to a temperature which is higher than said critical temperature $T_2$ and cooled down. The result is that any further heating will not have any influence on the condition of the material of the second bead 11. As examples for such substances the following ones can be named: Mixtures consisting of an epoxy resin and $BF_3$-amine complex; polyurethane adhesive substances curable under the influence of heat.

e. Slowly reacting two component systems

Such systems can be adjusted to a desired potlife by varying the chemical composition. These systems can be used as second bead 11 in all cases when an extended storage of the window is not expected. A protection by means of a foil 16 and 17, respectively, is not required, except to protect the second bead 11 from mechanical damage. As typical example for such substances can be named: Mixtures consisting of polyurethane prepolymers containing OH-groups and polyurethane prepolymers containing NCO-groups.

In any case, it is important to consider that the material chosen for the second bead 11 is chemically compatible with the material of the first already applied and cured bead 7. With other words, it must be ensured that the second bead 11, after having been activated, reliably adheres not only to the frame, flange or the like to which the window is to be connected but also to the first bead 7.

The following table shows, for the purpose of illustration, the most important attributes of some substances which can be used for the second bead 11. It is understood that the values in said table are only rough guiding figures.

| SUB-STANCE | STORAGE LIFE | ACTIVATION | POTLIFE |
| --- | --- | --- | --- |
| a. | 2–6 months | $O_2$—contact after removal of protection foil | 10–30 min |
| b. | 30 min to 2 weeks | atmospheric humidity | 10–30 min |
| c. | 6–12 months | heat | 5 s–1 min |
| d. | 6–12 months | heat | 20 s–3 min |
| e. | 30–180 min | — | 30–240 min |

What we claim is:

1. A prefabricated vehicle window adapted to be directly glued into a frame, a flange or the like, comprising
   a primer layer applied onto an edge portion of the vehicle window;
   a first profiled bead consisting of an already cured adhesive material applied onto said primer layer extending along an edge portion of said vehicle window;
   said already cured adhesive material having elastic properties but cannot be plastically deformed;
   said first profiled bead having a generally U-shaped cross section whereby the two legs of the U-shaped profile have different height, a first leg remote from the edge of the vehicle window having a greater height than a second leg adjacent to the edge of the vehicle window;
   said first profiled bead having a tub-like recess receiving a second bead consisting of a plastically deformable and/or activatable adhesive material which is chemically compatible with respect to the material of said first profiled bead.

2. A vehicle window according to claim 1 in which said first higher leg of said first profiled bead comprises a rib projecting toward the interior of said tub-like recess such that an edge of the frame, flange or the like into which the window has to be mounted may engage therewith.

3. A vehicle window according to claim 1 in which said second bead is fully received in the interior of said tub-like recess of said first bead.

4. A vehicle window according to claim 3 in which said second bead has an essentially triangular or trapezoidal cross section, the surface thereof adjacent to the opening of the tub-like recess ascending toward the higher leg of said first bead.

5. A vehicle window according to claim 4 in which said second bead having an essentially triangular or trapezoidal cross section has two essentially perpendicularly running faces, one face thereof resting on the ground of the tub-like recess and the other face thereof resting on the higher leg of said first bead.

6. A vehicle window according to claim 1 in which said first bead is at least partially covered by a removable cover foil such that said cover foil does not touch said second bead in the interior of said tub-like recess.

7. A vehicle window according to claim 6 in which said cover foil extends between said first and second leg of said first bead such that the tub-like recess of said first bead is sealed.

8. A vehicle window according to claim 6 in which said cover foil fully encloses said first bead.

9. A vehicle window according to claim 6 in which said cover foil is gas tight and/or moisture tight and/or light tight.

10. A vehicle window according to claim 6 in which said cover foil is adhesively but releasably connected to said first bead.

11. A vehicle window according to claim 6 in which said cover foil is a plastic foil which optionally may further comprise a metal layer.

12. A vehicle window according to claim 6 in which said cover foil is an aluminium-plastic sandwich foil.

13. A vehicle window according to claim 1 in which said first and/or said second bead consist(s) of a polyurethane adhesive material.

14. A vehicle window according to claim 1 in which said second bead consists of an adhesive material which cures under the influence of oxygen.

15. A vehicle window according to claim 1 in which said second bead consists of an adhesive material which cures under the influence of moisture.

16. A vehicle window according to claim 1 in which said second bead consists of an adhesive material which may be activated under the influence of heat.

17. A vehicle window according to claim 1 in which said second bead consists of an adhesive material which may be activated under the influence of heat and then irreversibly cures.

18. A vehicle window according to claim 1 in which said second bead consists of a slowly curing two component adhesive material. foil immediately after the step of depositing said second beam in said tub-like recess.

19. Use of the prefabricated vehicle window of claim 1 as a ready-to-mount unit adapted to be mounted in car bodies by gluing without the need of an additional mounting adhesive material.

* * * * *